United States Patent
Lim et al.

(10) Patent No.: US 10,334,600 B2
(45) Date of Patent: Jun. 25, 2019

(54) STUDIES ABOUT MSD LEVEL IN BAND 46

(71) Applicant: LG ELECTRONICS INC., Seoul (KR)

(72) Inventors: Suhwan Lim, Seoul (KR); Sangwook Lee, Seoul (KR); Dongik Lee, Seoul (KR); Jaehyuk Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/675,031

(22) Filed: Aug. 11, 2017

(65) Prior Publication Data

US 2018/0049202 A1    Feb. 15, 2018

Related U.S. Application Data

(60) Provisional application No. 62/374,008, filed on Aug. 12, 2016.

(51) Int. Cl.
| | |
|---|---|
| *H04W 72/04* | (2009.01) |
| *H04L 5/00* | (2006.01) |
| *H04L 23/00* | (2006.01) |
| *H04W 84/04* | (2009.01) |
| *H04W 88/02* | (2009.01) |

(52) U.S. Cl.
CPC ......... *H04W 72/0453* (2013.01); *H04L 5/001* (2013.01); *H04L 23/00* (2013.01); *H04W 84/042* (2013.01); *H04W 88/02* (2013.01)

(58) Field of Classification Search
CPC ........ H04B 1/034; H04B 1/38; H04B 1/3827; H04B 3/48; H04B 10/0775; H04B 17/102; H04B 1/0057; H04B 1/48; H04B 1/525; H04L 27/26; H04L 27/2602; H04L 5/001; H04L 23/00; H04W 72/0453; H04W 24/02; H04W 36/0069; H04W 72/005; H04W 72/02; H04W 72/0413; H04W 72/0473; H04W 88/02; H04W 84/042

See application file for complete search history.

(56) References Cited

U.S. PATENT DOCUMENTS

| | | | | |
|---|---|---|---|---|
| 2012/0322455 | A1* | 12/2012 | Oh | ............... H04W 72/048 455/450 |
| 2014/0204867 | A1* | 7/2014 | Lim | ............... H04W 72/0413 370/329 |

OTHER PUBLICATIONS

3GPP TS 36.101 V14.0.0, dated Jun. 2016 (Year: 2016).*

(Continued)

*Primary Examiner* — Daniel Lai
(74) *Attorney, Agent, or Firm* — Birch, Stewart, Kolasch & Birch, LLP

(57) ABSTRACT

There is provided a method for transmitting/receiving a signal. The method may be performed by a wireless terminal and comprise: transmitting, by the wireless terminal configured with a carrier aggregation, an uplink signal. The carrier aggregation may include a combination of a evolved universal terrestrial radio access (E-UTRA) operating band 46 and one of E-UTRA operation bands 5, 7, 8, 21, 28 and 41. The method may comprise: receiving a downlink signal. If the uplink signal is transmitted through one of E-UTRA operation bands 5, 7, 8, 21, 28 and 41 and if the downlink signal is received through the E-UTRA operating band 46, a predetermined maximum sensitivity degradation (MSD) is applied to receiving reference sensitivity of the downlink signal, thereby successfully receiving the signal.

18 Claims, 12 Drawing Sheets

(56) References Cited

OTHER PUBLICATIONS

3GPP TSG-RAN WG4 Meeting #78 R4-160201 by NTT DOCOMO, Inc., dated Feb. 2016 (Year: 2016).*
3GPP TSG-RAN WG4 Meeting #76 R4-154330 by TeliaSonera AB, dated May 2015 (Year: 2015).*
LTE Acronyms—lteencyclopedia, retrieved from https://sites.google.com/site/lteencyclopedia/lte-acronyms on Oct. 23, 2018 (Year: 2018).*

* cited by examiner

STUDIES ABOUT MSD LEVEL IN BAND 46

This application claims the benefit of priority of U.S. Provisional Application No. 62/374,008 filed on Aug. 12, 2016, which is incorporated by reference in its entirety herein.

FIELD OF THE INVENTION

The present invention relates to mobile communication.

RELATED ART

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

A frequency which can be used for LTE/LTE-A, that is, a carrier is defined in 3GPP by considering radio wave situations of various countries.

Meanwhile, when a terminal configured with a carrier aggregation of two downlink (DL) carriers transmits an uplink signal, a harmonic is generated, thereby influencing a downlink band of the terminal itself.

SUMMARY OF THE INVENTION

Accordingly, an object of the present invention is to solve the above-mentioned problems.

To achieve the foregoing purposes, the disclosure of the present invention proposes a method for transmitting/receiving a signal. The method may be performed by a wireless terminal and comprise: transmitting, by the wireless terminal configured with a carrier aggregation, an uplink signal. The carrier aggregation may include a combination of a evolved universal terrestrial radio access (E-UTRA) operating band 46 and one of E-UTRA operation bands 5, 7, 8, 21, 28 and 41. The method may comprise: receiving a downlink signal. If the uplink signal is transmitted through one of E-UTRA operation bands 5, 7, 8, 21, 28 and 41 and if the downlink signal is received through the E-UTRA operating band 46, a predetermined maximum sensitivity degradation (MSD) is applied to receiving reference sensitivity of the downlink signal, thereby successfully receiving the signal.

If the MSD of 0 dB is applied to the receiving reference sensitivity of the downlink signal, a gap bandwidth may be determined to guarantee the MSD of 0 dB.

If the uplink signal is transmitted through the E-UTRA operating band 5, the gap bandwidth may be 5 MHz to protect Band 46 from harmonic regions.

If the uplink signal is transmitted through the E-UTRA operation band 5, the MSD may be 5.65 dB when a gap bandwidth is 0 MHz from harmonic regions.

If the uplink signal is transmitted through the E-UTRA operation band 7, the MSD may be 28.27 dB when a gap bandwidth is 0 MHz from harmonic regions.

If the uplink signal is transmitted through the E-UTRA operation band 8, the MSD may be 4.26 dB when a gap bandwidth is 0 MHz from harmonic regions.

If the uplink signal is transmitted through the E-UTRA operation band 21, the MSD may be 23.45 dB when a gap bandwidth is 0 MHz from harmonic regions.

If the uplink signal is transmitted through the E-UTRA operation band 28, the MSD may be 3.12 dB when a gap bandwidth is 0 MHz from harmonic regions.

If the uplink signal is transmitted through the E-UTRA operation band 41, the MSD may be 30.35 dB when a gap bandwidth is 0 MHz from harmonic regions.

To achieve the foregoing purposes, the disclosure of the present invention proposes a wireless terminal for transmitting/receiving a signal. The wireless terminal may comprise: a transceiver configured with a carrier aggregation including a combination of a evolved universal terrestrial radio access (E-UTRA) operating band 46 and one of E-UTRA operation bands 5, 7, 8, 21, 28 and 41 and a processor configured to control the transceiver thereby transmitting an uplink signal and receiving a downlink signal. If the uplink signal is transmitted through one of E-UTRA operation bands 5, 7, 8, 21, 28 and 41 and if the downlink signal is received through the E-UTRA operating band 46, a predetermined maximum sensitivity degradation (MSD) is applied to receiving reference sensitivity of the downlink signal, thereby successfully receiving the signal.

According to the disclosure of the present invention, the problem of the conventional technology described above may be solved.

DESCRIPTION OF EXEMPLARY EMBODIMENTS

Figure 1:
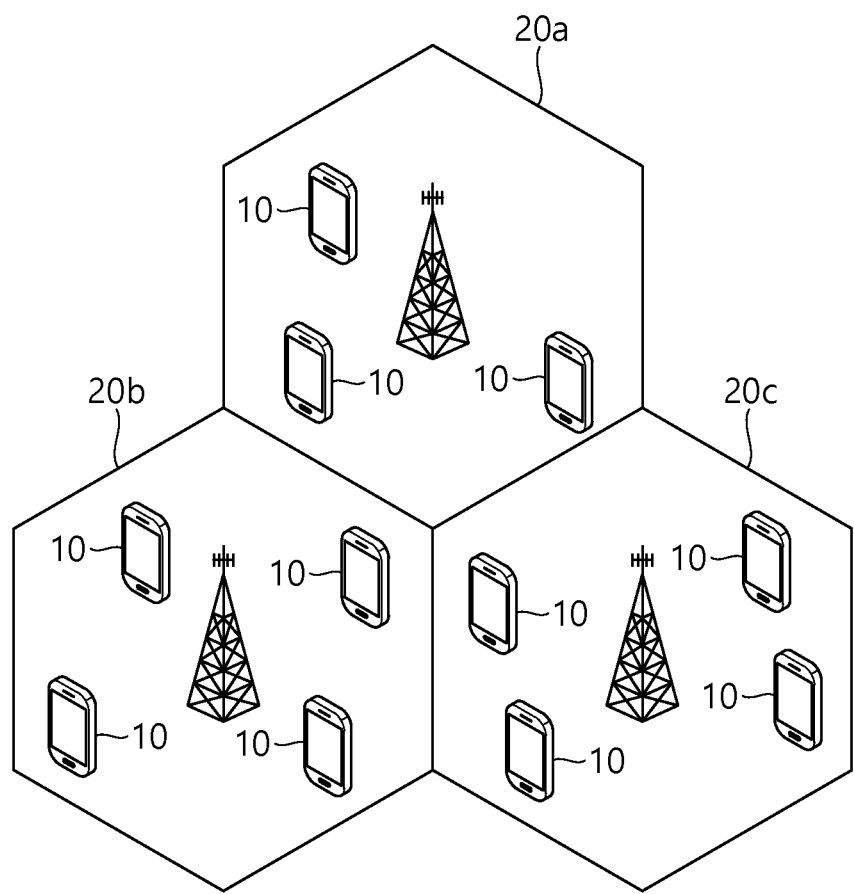
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
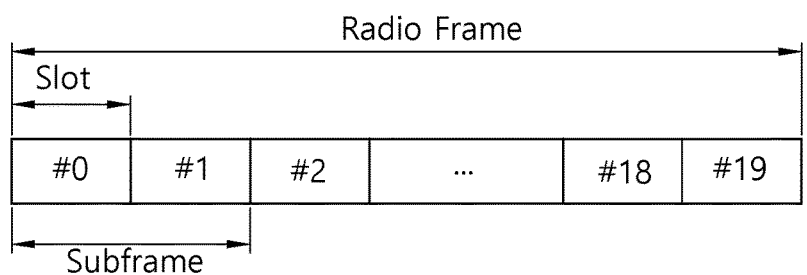
FIG. 2 illustrates a structure of a radio frame according to FDD in 3GPP LTE.

FIG. 2 Shows a Downlink Radio Frame Structure According to FDD of 3rd Generation Partnership Project (3GPP) Long Term Evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
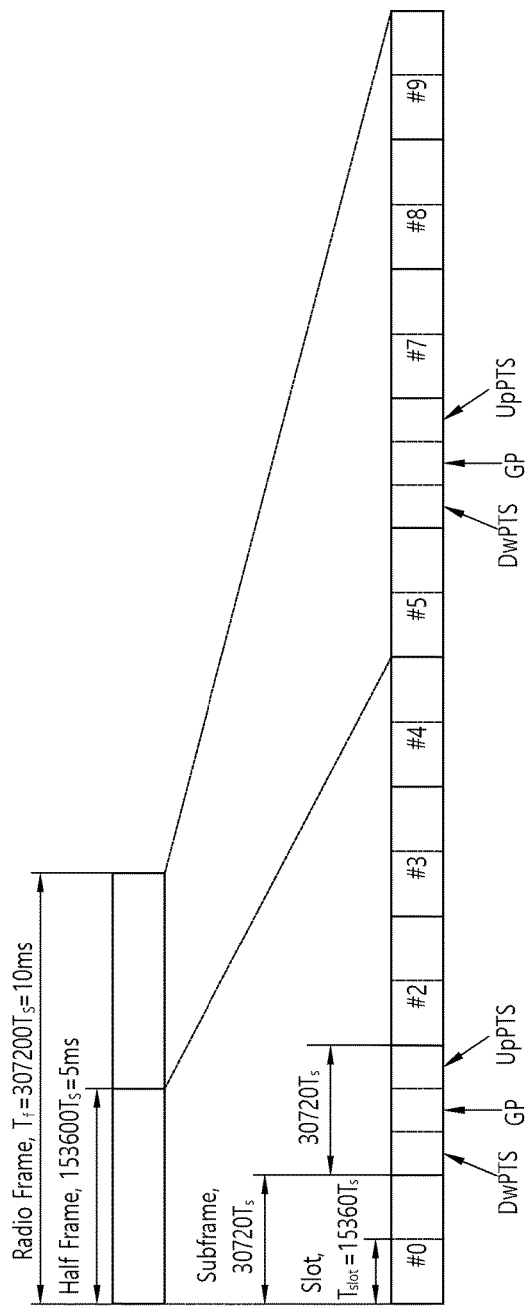
FIG. 3 illustrates a structure of a downlink radio frame according to TDD in the 3GPP LTE.

FIG. 3 Illustrates the Architecture of a Downlink Radio Frame According to TDD in 3GPP LTE.

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
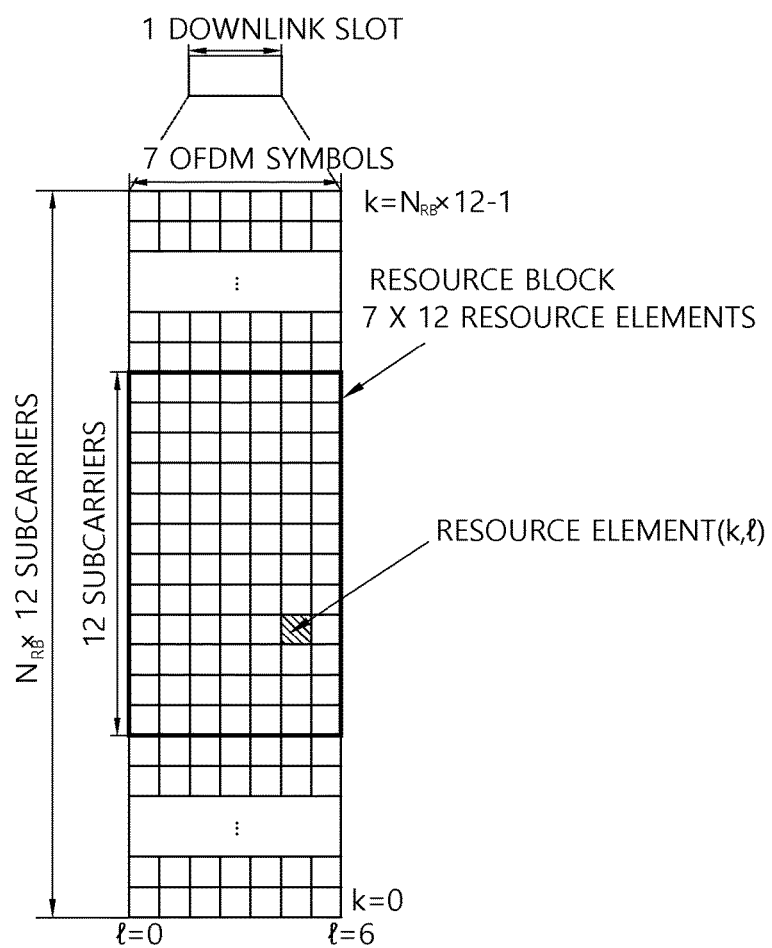
FIG. 4 is an exemplary diagram illustrating a resource grid for one uplink or downlink slot in the 3GPP LTE.

In 3GPP LTE, the resource grid for one uplink slot shown in FIG. 4 may also apply to the resource grid for the downlink slot.

Figure 5:
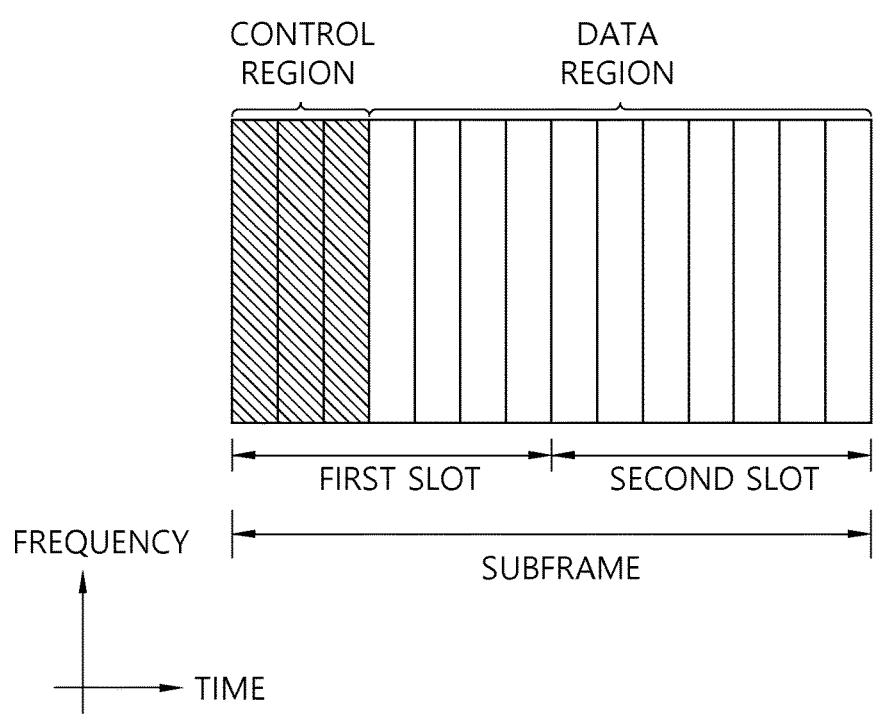
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
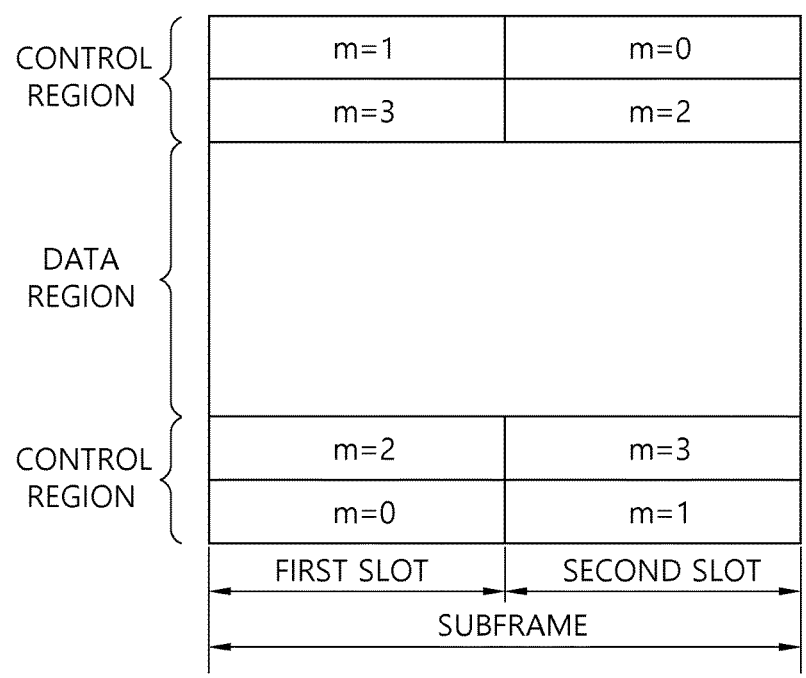
FIG. 6 illustrates the architecture of an uplink subframe in 3GPP LTE.

FIG. 6 Illustrates the Architecture of an Uplink Sub-Frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain.

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

TABLE 3

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 211.0 MHz-2155 MHz | FDD |
| 5 | 824 MHz-849 MHz | 869 MHz-894MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |

TABLE 3-continued

| Operating Band | Uplink (UL) operating band $F_{UL\_low}$-$F_{UL\_high}$ | Downlink (DL) operating band $F_{DL\_low}$-$F_{DL\_high}$ | Duplex Mode |
|---|---|---|---|
| 46 | 5150 MHz-5925 MHz | 5150 MHz-5925 MHz | TDD8, 9 |
| 47 | 5855 MHz-5925 MHz | 5855 MHz-5925 MHz | TDD |
| 48 | 3550 MHz-3700 MHz | 3550 MHz-3700 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD4 |
| 67 | N/A | 738 MHz-758 MHz | FDD2 |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD10 |

In this case, $F_{UL\_low}$ means the lowest frequency of an UL operating band. Furthermore, $F_{UL\_high}$ means the highest frequency of an UL operating band. Furthermore, $F_{DL\_low}$ means the lowest frequency of a DL operating band. Furthermore, $F_{DL\_high}$ means the highest frequency of a DL operating band.

Figure 7:
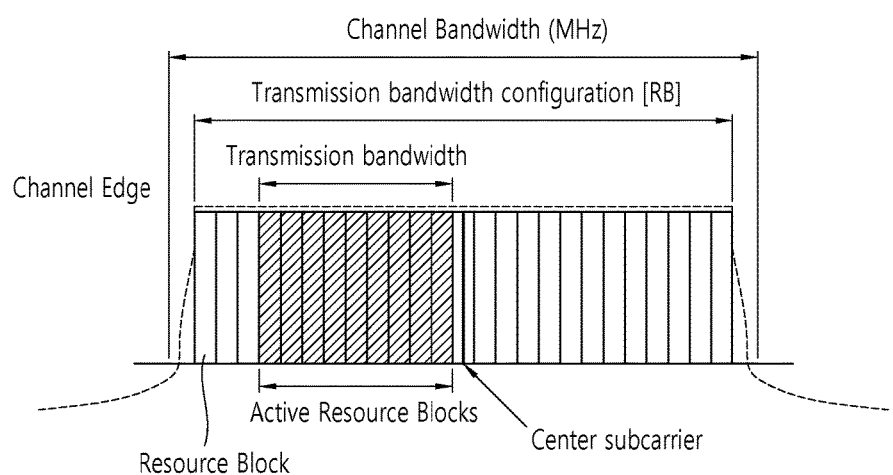
FIG. 7 shows a relation between a channel band MHz and a resource block (RB).

FIG. 7 Shows a Relation Between a Channel Band MHz and a Resource Block (RB).

As may be seen with reference to FIG. 7, a transmission bandwidth smaller than a channel bandwidth BWChannel is set. The setting of the transmission bandwidth is performed by a plurality of resource blocks (RBs). Furthermore, the outskirt of a channel is the highest and lowest frequencies separated by the channel bandwidth.

Meanwhile, as described above, a 3GPP LTE system supports channel bandwidths of 1.4 MHz, 3 MHz, 5 MHz, 10 MHz, 15 MHz and 20 MHz. A relation between such a channel bandwidth and a resource block is listed in the following table.

TABLE 4

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Meanwhile, intra-band contiguous CA bandwidth classes and their corresponding guard bands are as shown in the following table.

TABLE 5

| CA Bandwidth Class | Aggregated Transmission Bandwidth Configuration | Maximum number of CCs | Nominal Guard Band $BW_{GB}$ |
|---|---|---|---|
| A | $N_{RB,agg} \leq 100$ | 1 | a1 $BW_{Channel(1)}$ − 0.5Δf1 (NOTE2) |
| B | $N_{RB,agg} \leq 100$ | 2 | 0.05 max($BW_{Channel(1)}$, $BW_{Channel(2)}$) − 0.5Δf1 |
| C | $100 < N_{RB,agg} \leq 200$ | 2 | 0.05 max($BW_{Channel(1)}$, $BW_{Channel(2)}$) − 0.5Δf1 |
| D | $200 < N_{RB,agg} \leq$ [300] | FFS | 0.05 max($BW_{Channel(1)}$, $BW_{Channel(2)}$) − 0.5Δf1 |
| E | $[300] < N_{RB,agg} \leq$ [400] | FFS | FFS |
| F | $[400] < N_{RB,agg} \leq$ [500] | FFS | FFS |

NOTE1:
$BW_{Channel(i)}$ = 1, 2, 3 is the channel bandwidth of the E-UTRA component carriers defined in TS36.101 table 5.6-1, Δf1 represents subcarrier spacing of Δf when downlink, and Δf1 = 0 in downlink.
NOTE2:
In case that the channel frequency bandwidth is 1.4 MHz, a1 = 0.16/1.4, and in the remainder frequency band, a1 = 0.05.

In the above table, the brackets [ ] represent that the value therebetween is not completely determined and may be varied. FFS stands for 'For Further Study.' $N_{RB\_agg}$ is the number of RBs aggregated in an aggregation channel band.

<License Assisted Access (LAA)>

Recently, as more communication devices require a larger communication capacity, the efficient utilization of the limited frequency band in the next generation wireless communication system is gradually becoming a more and more important requirement. The cellular communication system such as LTE system is considering to utilize unlicensed band such as 2.4 GHz which is used by the existing WLAN system or unlicensed band such as 5 GHz band, in the traffic detouring. Such an unlicensed band may be carrier-aggregated (CA) with the licensed band so as to be used. Likewise, using the unlicensed band under the support of the licensed band by the carrier aggregation is called license assisted access (LAA).

Figure 8:
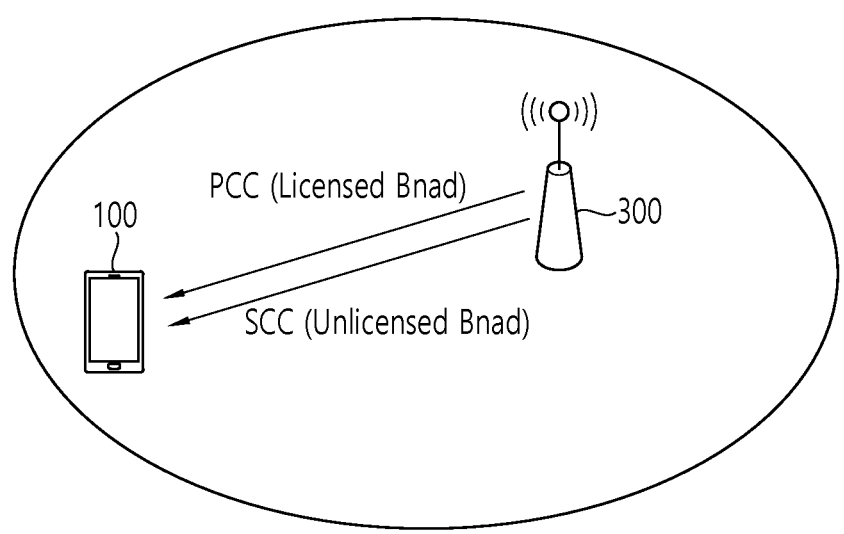
FIG. 8 illustrates an example of using licensed band and unlicensed band as carrier aggregation.

FIG. 8 Illustrates an Example of Using Licensed Band and Unlicensed Band as Carrier Aggregation.

In order to transmit and receive signals through the carrier of the unlicensed band which does not guarantee the exclusive use of a certain system, as shown in FIG. 8, a small cell transmits signals to UE 100 or the UE transmits signals to the small cell 30 by using the carrier aggregation of the LTE-A band, which is the licensed band, and the unlicensed band. Here, for example, the carrier in the licensed band may be understood as a primary CC (may also be referred to as "PCC" or "PCell"), and the carrier of the unlicensed band may be understood as the secondary CC (may also be referred to as "SCC" or "SCell"). However, even in the situation where a plurality of licensed bands and a plurality of unlicensed bands are used as the carrier aggregation scheme, the above suggested schemes may be applied, and even in the situation where signals are transmitted and received between the eNB and the UE with only the unlicensed band, the schemes may be applied. Further, the suggested schemes may also be applied in systems with different features as well as 3GPP LTE system.

Further, as an example of an unlicensed band operation which is operated with a contention-based arbitrary connection scheme, an eNB 200 may perform carrier sensing (CS) before transmitting and receiving data. Likewise, performing carrier sensing (CS) before data transmission may be defined as listen before talk (LBT). At this time, the case where another communication node does not transmit signals may be defined as having been confirmed by clear channel assessment (CCA).

DISCLOSURE OF THE PRESENT SPECIFICATION

Figure 9:
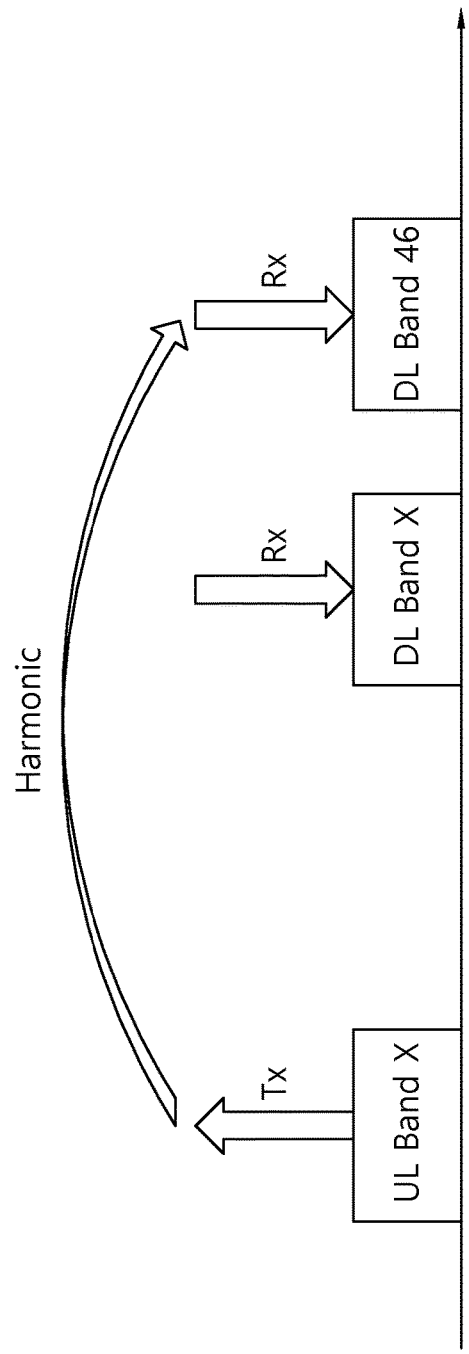
FIG. 9 illustrates an example of sensitivity degradation by harmonics component.

FIG. 9 Illustrates an Example of Sensitivity Degradation by Harmonics Component.

As shown in FIG. 9, in 2 downlinks (DLs)/1 uplink (UL) CA band combination, a harmonic component caused by an uplink transmission may leak into a DL band 46.

Accordingly, the present specification discloses a first study about how much sensitivity relaxation is required in band 46 due to x-order harmonics in 2 downlinks (DLs)/1 uplink (UL) CA band combination. Also, the present specification discloses a second study about how far it is separated from a band effected by the harmonics in order to meet an existing reference sensitivity (REFSENS) requirement in case where the sensitivity relaxation is not allowed. The first study is aimed at providing a frequency gap for preventing a degradation of the reception performance.

Hereinafter, results for measuring attenuation level in 5.9 GHz band and characteristic of radio frequency (RF) elements will be described.

Below Table 6 lists results for measuring harmonic in output terminal of the power amplifier (PA).

TABLE 6

| Release | Band | | Order | | Harmonic (Max) [dBm] |
|---|---|---|---|---|---|
| 13 | B1 | 1920-1980 | 3× | 5760-5940 | −14.15 |
| 13 | B2 | 1850-1910 | 3× | 5550-5730 | −14 |
| 13 | B3 | 1710-1785 | 3× | 5130-5355 | −16.31 |
| 13 | B4 | 1710-1755 | 3× | 5130-5265 | −17 |
| 14 | B5 | 824-849 | 7× | 5768-5943 | −38.31 |
| 13 | B7 | 2500-2570 | 2× (just-miss) | No overlapped in B46 | −29.08 |
| 14 | B8 | 880-915 | 6× | 5280-5490 | −36.36 |
| 14 | B11 | 1428-1448 | 4× | 5712-5792 | TBD |
| 14 | B13 | 777-787 | 7× | 5439-5509 | −37.54 |
| 14 | B19 | 830-845 | 7× | 5810-5915 | −42.07 |
| 14 | B21 | 1448-1463 | 4× | 5792-5852 | TBD |
| 14 | B28 | 703-748 | 8× | 5624-5984 | −36.67 |
| 14 | B39 | 1880-1920 | 3× | 5640-5760 | −13.52 |
| 14 | B40 | 2300-2400 | 2× | No overlapped in B46 | |
| 13 | B41 | 2496-2690 | 2× | 4992-5380 | −11.37 |
| 13 | B42 | 3400-3600 | Freq proximity | No overlapped in B46 | |
| 14 | B66 | 1710-1780 | 3× | 5130-5340 | −16.31 |

Here, the TBD means 'to be discussed'.

Below Table 7 lists attenuation levels in 5.9 GHz according to frequency bands and vendors of duplexer.

TABLE 7

| Band | Vendor | tech | P/N | Tx IL typ. | Rx IL typ. | Tx Atten(5150~5925 MHz) [dB] typ. | Tx Atten(5150~5925 MHz) [dB] min. |
|---|---|---|---|---|---|---|---|
| B1 | Murata | DPX | SAYEY1G95GA0F0A | 1.5 | 1.8 | 21 | 16 |
| B2 | EPCOS | DPX | D5295 (FEMiD) | 1.6 | 2.1 | 17 | 11 |
| B3 | Murata | DPX | SAYFH1G74CA0B0A | 2.0 | 2.6 | 20 | 10 |
| B4 | Murata | DPX | SAYEY1G73BC0F0AR00 | 2.1 | 1.8 | 16 | 10 |
| B5 | Murata | DPX | LMSWARGP-H77 (FEMiD) | 2.0 | 2.6 | | 15 |
| B7 | Murata | DPX | SAYEY2G53BC0F0AR00 | 2.2 | 2.0 | 39 | 20 |
| B8 | EPCOS | DPX | B8605 | 2.0 | 1.7 | 21 | 10 |
| B11 | Murata | DPX | SAYRF1G43BA0F0A | 1.3 | 1.6 | 21 | 12 |
| B13 | Qorvo | DPX | TQQ1013 | 2.2 | 2.1 | 30 | 20 |
| B19 | Murata | DPX | LMSWARGP-H77 (FEMiD) | 2.0 | 2.6 | | 15 |
| B21 | Murata | DPX | SAYEY1G45BA0F0A | 1.5 | 1.4 | 13 | 7 |
| B28 | WISOL | DPX | B8538(B28A) B8539(B28B) | 1.9 | 2.3 | 22 | 15 |
| B39 | Murata | TDD_Filter | LMSWARGP-H77 (FEMiD) | 1.6 | 1.6 | | 15 |
| B41 | Murata | TDD_Filter | SAFRD2G59MA0F0A | 3.3 | 3.3 | 22 | 17 |
| B66 | EPCOS | DPX | MQ02B | 2.7 | 2.6 | 31 | 20 |

Below table 8 show the UE UL harmonics impacts to Band 46 for LAA CA band combinations in rel-13 and rel-14.

TABLE 8

| Licensed Band | | | B46 Range (MHz) 5150-5925 | Conclusion MSD |
|---|---|---|---|---|
| | UL Range (MHz) | Order | Harmonic Range (MHz) | with/without HTF | GAP |
| B1 | 1920-1980 | 3× | 5760-5940 | Completed | [15] |
| B2 | 1850-1910 | 3× | 5550-5730 | Completed | [15] |
| B3 | 1710-1785 | 3× | 5130-5355 | Completed | [15] |
| B4 | 1710-1755 | 3× | 5130-5265 | Completed | [15] |
| B5 | 824-849 | 7× | 5768-5943 | TBD | TBD |
| B7 | 2500-2570 | 2× | No overlapped in B46 | TBD | TBD |
| B8 | 880-915 | 6× | 5280-5490 | TBD | TBD |
| B11 | 1428-1448 | 4× | 5712-5792 | TBD | TBD |
| B13 | 777-787 | 7× | 5439-5509 | TBD | TBD |
| B19 | 830-845 | 7× | 5810-5915 | TBD | TBD |
| B21 | 1448-1463 | 4× | 5792-5852 | TBD | TBD |
| B28 | 703-748 | 8× | 5624-5984 | TBD | TBD |
| B39 | 1880-1920 | 3× | 5640-5760 | Completed | [15] |
| B40 | 2300-2400 | 2× | No overlapped in B46 | TBD | N/A |
| B41 | 2496-2690 | 2× | 4992-5380 | TBD | TBD |
| B42 | 3400-3600 | 2× | No overlapped in B46 | TBD | N/A |
| B66 | 1710-1780 | 3× | 5130-5340 | Completed | [15] |

However, the other harmonics impact should be discussed to decide the GAP length and required maximum Sensitivity degradation (MSD) level.

I. Analysis on UL Harmonics Problems for 2DLs/1UL LAA CA UE

To analyses the UL harmonics problem in Band 46, both RF architectures as below are to be considered.

Option 1: Separate Antenna; Architecture for LAA band

Option 1-1: Option1+without a harmonic transfer function (HTF)

Option 1-2: Option1+with HTF

Figure 10A:
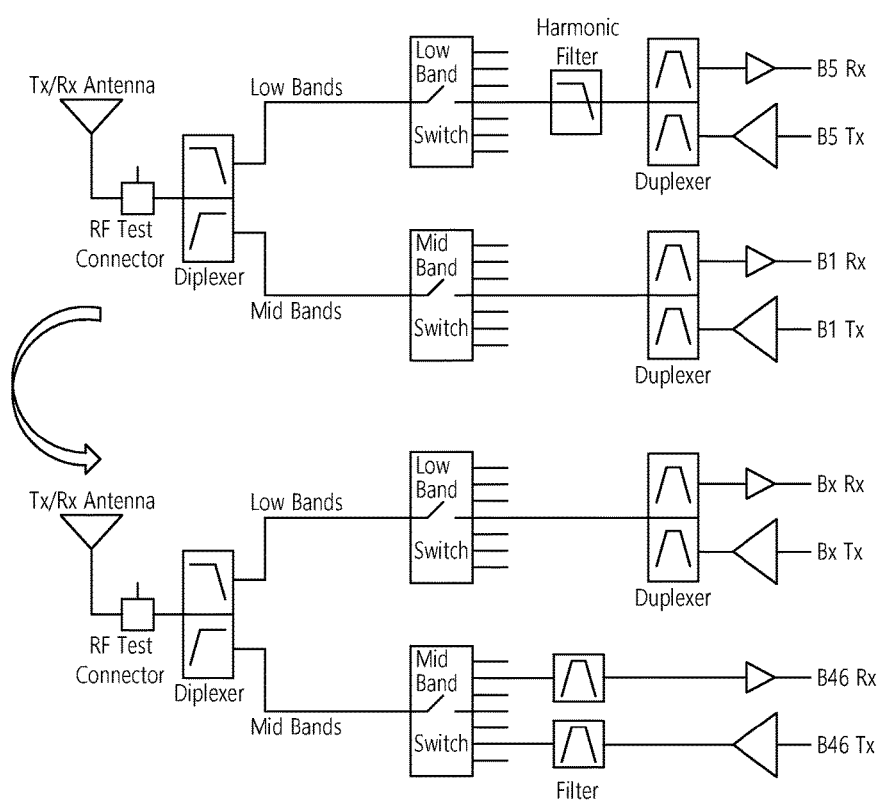
FIG. 10a shows the separate Antenna RF architecture with HTF.
Figure 10B:
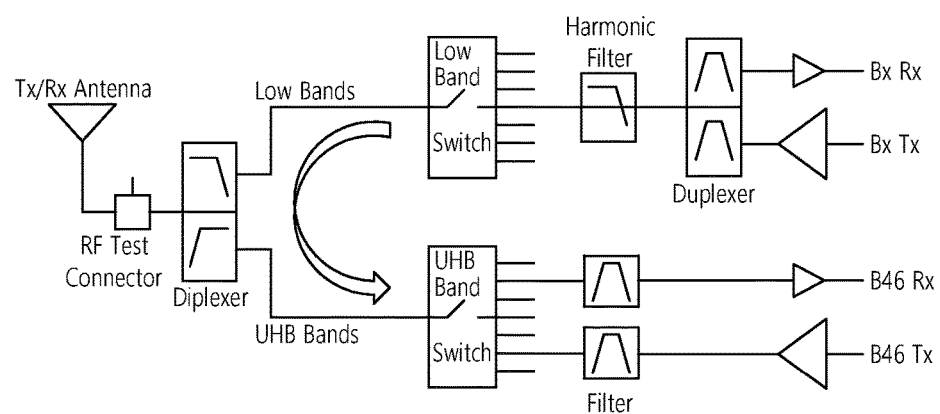
FIG. 10b shows the shared antenna RF architecture with HTF.

Option 2: Shared Antenna; Architecture for LAA band
Option 2-1: Option2+without HTF
Option 2-2: Option2+with HTF FIG. 10a shows the separate Antenna RF Architecture with HTF. And, FIG. 10b shows the Shared Antenna RF Architecture with HTF.

As shown in FIG. 10a, a harmonic filter such as HTF is inserted to an RF chain for Band 5 and an RF chain for Band 46, respectively. Also, as shown in FIG. 10b, harmonic filter such as HTF is inserted to an RF chain for a low band.

I-1. $7^{th}$ Harmonic Interference Analysis (B5, B13 and B19) in B46

For the MSD and required GAP, 7th Harmonic interference level is to be analyzed for CA_5A-46A UE. Here, the CA_5A-46A means a carrier aggregation of band 5 with CA bandwidth class A (i.e., 100 RBs or 20 MHz) defined in Table 5 and band 46 with CA bandwidth class A (i.e., 100 RBs or 20 MHz) defined in Table 5.

The required GAP will be specified by specific harmonic order. So the proposed GAP will be used for Band 5 and Band 13 and Band 19. But MSD can be different for operating bands due to RF component characteristics.

Four (4) candidate RF architectures are considered for CA_5A-46A UE.

I-1-1. Option 1-1: Separate Antenna without HTF

Below Table 9 shows the detail isolation parameters for RF components of specific CA_5A-46A band combination.

TABLE 9

| Parameter | Primary | | Diversity | |
|---|---|---|---|---|
| | Value | H7 level | Value | H7 level |
| B5 Tx in PA output | 28 | | 28 | |
| B5 PA H7 attenuation | 66 | −38.00 | 66 | −38.00 |
| B5 duplexer H7 attenuation | 15 | −53.00 | 15 | −53.00 |
| Harmonic filter | 0 | −53.00 | 0 | −53.00 |
| LB switch H7 | −120 | −53.00 | −120 | −53.00 |
| Diplexer attenuation | 25 | −78.00 | 25 | −78.00 |
| Antenna isolation | 10 | −88.00 | 10 | −88.00 |
| Diplexer pathloss | 0.7 | −88.70 | 0.7 | −88.70 |
| UHB switch attenuation | 0.7 | −89.40 | 0.7 | −89.40 |
| UHB switch H7 | −130 | −89.40 | −110 | −89.36 |
| B46 Rx filter attenuation | 1.5 | −90.90 | 1.5 | −90.86 |
| B46 Rx filter H7 | −110 | −90.85 | −110 | −90.81 |
| B5 PA to B46 LNA isolation | 60 | −98.00 | 60 | −98.00 |
| Composite | | −90.08 | | −90.05 |

To derive MSD level, it is assumed that a total front end loss is 2.9 dB for the LAA path, then the MRC MSD level by 7th UL harmonic at Band 46 LNA is as follows.

And, the gap is proposed to guarantee 0 dB MSD by measurement.

Below Table 10 shows UL $7^{th}$ Harmonics interference level at B46 LNA

TABLE 10

| | Thermal | H7 level (dBm) | Total Noise (dB) | MSD (dB) | GAP for 0 MSD |
|---|---|---|---|---|---|
| Main Path | −98.09 | −90.08 | −89.44 | 8.65 | 5 MHz |
| Diversity Path | −98.09 | −90.05 | −89.42 | 8.67 | |
| After MRC | | −93.08 | −92.44 | 5.65 | |

From the results, the 7th harmonic may impact to the Band 46 sensitivity levels for separate Antenna RF architecture w/o HTF. However, considering 5 MHz Gap from harmonics region in B46, it is possible to keep the existing REFSENS requirements of Band 46.

I-1-2. Option 1-2: Separate Antenna with HTF

Below Table 11 shows CA_5A-46A UE RF FE component isolation parameters

TABLE 11

| Parameter | Primary | | Diversity | |
|---|---|---|---|---|
| | Value | H7 level | Value | H7 level |
| B5 Tx in PA output | 28 | | 28 | |
| B5 PA H7 attenuation | 66 | −38.00 | 66 | −38.00 |
| B5 duplexer H7 attenuation | 15 | −53.00 | 15 | −53.00 |
| Harmonic filter | 20 | −73.00 | 20 | −73.00 |
| LB switch H7 | −120 | −73.00 | −120 | −73.00 |
| Diplexer attenuation | 25 | −98.00 | 25 | −98.00 |
| Antenna isolation | 10 | −108.00 | 10 | −108.00 |
| Diplexer pathloss | 0.7 | −108.70 | 0.7 | −108.70 |
| UHB switch attenuation | 0.7 | −109.40 | 0.7 | −109.40 |
| UHB switch H7 | −130 | −109.36 | −110 | −106.68 |
| B46 Rx filter attenuation | 1.5 | −110.86 | 1.5 | −108.18 |
| B46 Rx filter H7 | −110 | −107.40 | −110 | −105.98 |
| B5 PA to B46 LNA isolation | 60 | −98.00 | 60 | −98.00 |
| Composite | | −97.53 | | −97.36 |

From the Table 11, the MRC MSD level by $7^{th}$ UL harmonic at Band 46 LNA can be derived as below for separate antenna with HTF architecture.

Below table 12 shows UL 7th Harmonics interference level at B46 LNA.

TABLE 12

| | Thermal | H7 level (dBm) | Total Noise (dB) | MSD (dB) | GAP for 0 MSD |
|---|---|---|---|---|---|
| Main Path | −98.09 | −97.53 | −94.79 | 3.30 | 0 MHz |
| Diversity Path | −98.09 | −97.36 | −94.70 | 3.39 | |
| After MRC | | −100.45 | −97.75 | 0.34 | |

From the results, the 7th harmonic impacts can be reduced by HTF. However, it may assumed that there is no MSD test at UL harmonic regions in Band 46. Hence this HTF usage can be treated as a UE implementations.

I-1-3. Option 2-1: Shared Antenna without HTF

Below table 13 shows CA_5A-46A UE RF FE component isolation parameters.

TABLE 13

| Parameter | Primary | | Diversity | |
|---|---|---|---|---|
| | Value | H3 level | Value | H3 level |
| B5 Tx in PA output | 28 | | 28 | |
| B5 PA H7 attenuation | 66 | −38.00 | 66 | −38.00 |
| B5 duplexer H7 attenuation | 15 | −53.00 | 15 | −53.00 |
| Harmonic filter | 0 | −53.00 | 0 | −53.00 |
| LB switch H7 | −120 | −53.00 | −120 | −53.00 |
| Diplexer attenuation | 25 | −78.00 | 25 | −78.00 |
| Antenna isolation | 0 | −78.00 | 10 | −88.00 |
| UHB switch attenuation | 0.7 | −78.70 | 0.7 | −88.70 |
| UHB switch H7 | −130 | −78.70 | −110 | −88.67 |

TABLE 13-continued

|  | Primary | | Diversity | |
|---|---|---|---|---|
| Parameter | Value | H3 level | Value | H3 level |
| B46 Rx filter attenuation | 1.5 | −80.20 | 1.5 | −90.17 |
| B46 Rx filter H7 | −110 | −80.20 | −110 | −90.12 |
| B5 PA to B46 LNA isolation | 60 | −98.00 | 60 | −98.00 |
| Composite | | −80.12 | | −89.47 |

From the Table 13, the MRC MSD level by 7th UL harmonic at Band 46 LNA may be derived as below.

Below table 14 shows UL 7th Harmonics interference level at B46 LNA.

TABLE 14

|  | Thermal | H7 level (dBm) | Total Noise (dB) | MSD (dB) | GAP for 0 MSD |
|---|---|---|---|---|---|
| Main Path | −98.79 | −80.12 | −80.07 | 18.72 | 10 MHz |
| Diversity Path | −98.79 | −89.47 | −88.99 | 9.80 | |
| After MRC | | | −89.94 | 9.28 | |

From the results, the option 2-1 RF architecture is worst case for sensitivity reduction by $7^{th}$ harmonic products.

I-1-4. Option 2-2: Shared Antenna with HTF

Below Table 15 shows CA_5A-46A UE RF FE component isolation parameters.

TABLE 15

|  | Primary | | Diversity | |
|---|---|---|---|---|
| Parameter | Value | H3 level | Value | H3 level |
| B5 Tx in PA output | 28 | | 28 | |
| B5 PA H7 attenuation | 66 | −38.00 | 66 | −38.0 |
| B5 duplexer H7 attenuation | 15 | −53.00 | 15 | −53.0 |
| Harmonic filter | 20 | −73.00 | 20 | −73.0 |
| LB switch H7 | −120 | −73.00 | −120 | −73.0 |
| Diplexer attenuation | 25 | −98.00 | 25 | −98.0 |
| Antenna isolation | 0 | −98.00 | 10 | −108.0 |
| UHB switch attenuation | 0.7 | −98.70 | 0.7 | −108.7 |
| UHB switch H7 | −130 | −98.70 | −110 | −106.29 |
| B46 Rx filter attenuation | 1.5 | −100.20 | 1.5 | −107.79 |
| B46 Rx filter H7 | −110 | −99.76 | −110 | −105.75 |
| B5 PA to B46 LNA isolation | 60 | −98.00 | 60 | −98.00 |
| Composite | | −95.78 | | −97.33 |

From the above table 15, the MRC MSD level by 7th UL harmonic at Band 46 LNA can be derived as below.

Below Table 16 shows UL 7th Harmonics interference level at B46 LNA.

TABLE 16

|  | Thermal | H7 level (dBm) | Total Noise (dB) | MSD (dB) | GAP for 0 MSD |
|---|---|---|---|---|---|
| Main Path | −98.79 | −95.78 | −94.02 | 4.77 | 5 MHz |
| Diversity Path | −98.79 | −97.33 | −94.99 | 3.80 | |
| After MRC | | | −99.63 | 1.25 | |

From these 7th harmonics analysis according to the RF architecture, it is proposed that the MSD level and required GAP for 7th harmonic issue in Band 46.

Below table 17 shows required MSD and GAP by UL 7th Harmonics interference for CA_5A-46A.

TABLE 17

|  | Separate Ant. without HTF (option1-1) | Separate Ant. with HTF (option1-2) | Shared Ant. without HTF (option 2-1) | Shared Ant. with HTF (option 2-2) |
|---|---|---|---|---|
| MSD | 5.65 dB | 0.34 dB | 9.28 dB | 1.25 dB |
| GAP | 5 MHz | 0 MHz | 10 MHz | 5 MHz |

I-2. $2^{nd}$ Harmonic Interference Analysis (B41, B7) in B46

The $2^{nd}$ harmonics of band 7 just fall into 5000~5140 MHz. It means that only 10 MHz guard allowed to protect the lower edge of Band 46. The analysed MSD level for CA_7A-46A is in Table 18.

Below Table 18 shows required MSD and GAP by UL 2nd Harmonics interference for CA_7A-46A.

TABLE 18

|  | Separate Antenna without HTF (option1-1) | Separate Ant. with HTF (option1-2) | Shared Ant. without HTF (option 2-1) | Shared Ant. w/ HTF (option 2-2) |
|---|---|---|---|---|
| MSD | 28.27 dB | 15.18 dB | 33.31 dB | 18.29 dB |
| GAP | 25 MHz | 15 MHz | 30 MHz | 15 MHz |

The TDD-TDD CA combination, a band pass filter can be used instead of Duplexer filter. This analysis is only applicable for asynchronous case in TDD-TDD CA band combination. The transmit signal of B41 will be interfered to the receiving signal of Band 46 at asynchronous environment.

Below table 12 shows required MSD and GAP by UL 2nd Harmonics interference for CA_41A-46A.

TABLE 19

|  | Separate Antenna without HTF (option1-1) | Shared antenna without HTF (option 2-1) |
|---|---|---|
| MSD | 30.35 dB | 35.79 dB |
| GAP | 25 MHz | 30 MHz |

I-3. $4^{th}$ Harmonic Interference Analysis (B11, B21) in B46

The $4^{th}$ harmonics of band 21 just fall into 5792~5852 MHz. The analyzed MSD level for CA_21A-46A is in Table 20. Table 20 shows required MSD and GAP by UL 6th Harmonics interference for CA_21A-46A.

TABLE 20

|  | Separate antenna without HTF (option1-1) | Separate antenna with HTF (option1-2) | Shared antenna without HTF (option 2-1) | Shared antenna with HTF (option 2-2) |
|---|---|---|---|---|
| MSD | 23.45 dB | 12.04 dB | 27.39 dB | 14.48 dB |
| GAP | 20 MHz | 10 MHz | 25 MHz | 10 MHz |

I-4. $6^{th}$ Harmonic Interference Analysis (B8) in B46

The $6^{th}$ harmonics of band 8 just fall into 5280~5490 MHz. The analyzed MSD level for CA_8A-46A is in Table 21. Below table 21 shows Required MSD and GAP by UL 6th Harmonics interference for CA_8A-46A.

TABLE 21

| | Separate antenna without HTF (option1-1) | Separate antenna with HTF (option1-2) | Shared antenna without HTF (option 2-1) | Shared antenna with HTF (option 2-2) |
|---|---|---|---|---|
| MSD | 4.26 dB | 1.35 dB | 7.55 dB | 2.04 dB |
| GAP | 5 MHz | 5 MHz | 5 MHz | 5 MHz |

I-5. $8^{th}$ Harmonic Interference Analysis (B28) in B46

The $8^{th}$ harmonics of band 28 just fall into 5624~5984 MHz. The analyzed MSD level for CA_28A-46A is in Table 22. Table 22 shows required MSD and GAP by UL 8th Harmonics interference for CA_28A-46A.

TABLE 22

| | Separate antenna without HTF (option1-1) | Separate antenna with HTF (option1-2) | Shared antenna without HTF (option 2-1) | Shared antenna with HTF (option 2-2) |
|---|---|---|---|---|
| MSD | 3.12 dB | 1.54 dB | 5.10 dB | 1.98 dB |
| GAP | 5 MHz | 5 MHz | 5 MHz | 5 MHz |

As such, the estimated H2/H4/H6/H7/H8 interference levels in Band 46 have been discussed. The above-discussed MSD should be considered. Also the above-discussed GAP length should be considered according to the harmonics order of each CA band combination.

The above described embodiments of the present invention may be implemented through various means. For example, the embodiments of the present invention may be implemented in hardware, firmware, software, and a combination thereof, which are described in detail with reference to the drawings.

Figure 11:
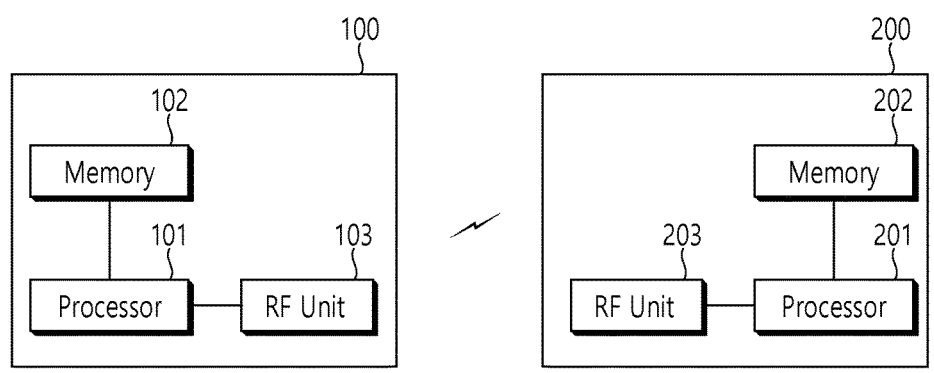
FIG. 11 is a block diagram of a wireless communication system in which the disclosure of the present specification is implemented.

FIG. 11 is a Block Diagram of a Wireless Communication System in which the Disclosure of the Present Specification is Implemented.

An eNB 200 includes a processor 201, a memory 202, and an RF unit 203. A memory 202 is connected to a processor 201 and saves various information for operating the processor 201. The RF unit 203 is connected to the processor 201 and transmits and/or receives a wireless signal. The processor 201 implements the suggested function, process, and/or method. In the above described embodiments, the operation of the eNB may be implemented by the processor 201.

A UE includes a processor, a memory 102, and an RF unit 103. The memory 102 is connected to the processor 101 and saves various information for operating the processor 101. The RF unit is connected to the processor 101 and transmits and/or receives a wireless signal. The processor 101 implements the suggested function, process, and/or method.

The processor may includes an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting/receiving a signal in carrier aggregation, the method performed by a User Equipment (UE) and comprising:
   transmitting, by the UE, an uplink signal by using an uplink carrier based on one band of evolved universal terrestrial radio access (E-UTRA) operating bands 5, 7, 8, 21, 28 and 41; and
   receiving, by the UE, a downlink signal by using a first downlink carrier based on a E-UTRA operating band 46 and a second downlink carrier based on one band of the E-UTRA operating bands 5, 7, 8, 21, 28 and 41,
   wherein the uplink carrier, the first downlink carrier, and the second downlink carrier are configured to be aggregated by the carrier aggregation, and
   wherein the reception of the downlink signal by using the first downlink carrier is performed based on a receiving reference sensitivity to which a predetermined maximum sensitivity degradation (MSD) value, which is related with a combination of the E-UTRA band and the one band of the E-UTRA operating bands 5, 7, 8, 21, 28 and 41, is applied.

2. The method of claim 1, wherein when the UE is configured to not use the predetermined MSD value, a gap bandwidth to protect the E-UTRA band 46 from harmonic regions is determined to guarantee the predetermined MSD value of 0 dB.

3. The method of claim 2, wherein when the uplink signal is transmitted by using the uplink carrier based on the E-UTRA operating band 5, the gap bandwidth is determined to be 5 MHz to protect the E-UTRA band 46 from the harmonic regions.

4. The method of claim 1, wherein when the uplink signal is transmitted by using the uplink carrier based on the E-UTRA operating band 5, the predetermined MSD value is 5.65 dB.

5. The method of claim 1, wherein when the uplink signal is transmitted by using the uplink carrier based on the E-UTRA operating band 7, the predetermined MSD value is 28.27 dB.

6. The method of claim 1, wherein when the uplink signal is transmitted by using the uplink carrier based on the E-UTRA operating band 8, the predetermined MSD value is 4.26 dB.

7. The method of claim 1, wherein when the uplink signal is transmitted by using the uplink carrier based on the E-UTRA operating band 21, the predetermined MSD value is 23.45 dB.

8. The method of claim 1, wherein when the uplink signal is transmitted by using the uplink carrier based on the E-UTRA operating band 28, the predetermined MSD value is 3.12 dB.

9. The method of claim 1, wherein when the uplink signal is transmitted by using the uplink carrier based on the E-UTRA operating band 41, the predetermined MSD value is 30.35 dB.

10. A wireless terminal for transmitting/receiving a signal in carrier aggregation, the wireless terminal comprising:
a transceiver configured to receive and transmit signals; and
a processor operatively connected to the transceiver, wherein the processor is configured to:
control the transceiver to transmit an uplink signal by using an uplink carrier based on one band of evolved universal terrestrial radio access (E-UTRA) operating bands 5, 7, 8, 21, 28 and 41; and
control the transceiver to receive a downlink signal by using a first downlink carrier based on a E-UTRA operating band 46 and a second downlink carrier based on one band of the E-UTRA operating bands 5, 7, 8, 21, 28 and 41,
wherein the uplink carrier, the first downlink carrier, and the second downlink carrier are configured to be aggregated by the carrier aggregation, and
wherein the reception of the downlink signal by using the first downlink carrier is performed based on a receiving reference sensitivity to which a predetermined maximum sensitivity degradation (MSD) value, which is related with a combination of the E-UTRA band and the one band of the E-UTRA operating bands 5, 7, 8, 21, 28 and 41, is applied.

11. The wireless terminal of claim 10, wherein when the UE is configured to not use the predetermined MSD value, a gap bandwidth to protect the E-UTRA band 46 from harmonic regions is determined to guarantee the predetermined MSD value of 0 dB.

12. The wireless terminal of claim 11, wherein when the if the uplink signal is transmitted by using the uplink carrier based on the E-UTRA operating band 5, the gap bandwidth is determined to be 5 MHz to protect the E-UTRA band 46 from the harmonic regions.

13. The wireless terminal of claim 10, wherein when the uplink signal is transmitted by using the uplink carrier based on the E-UTRA operating band 5, the predetermined MSD value is 5.65 dB.

14. The wireless terminal of claim 10, wherein when the uplink signal is transmitted by using the uplink carrier based on the E-UTRA operating band 7, the predetermined MSD value is 28.27 dB.

15. The wireless terminal of claim 10, wherein when the uplink signal is transmitted by using the uplink carrier based on the E-UTRA operating operation band 8, the predetermined MSD value is 4.26 dB.

16. The wireless terminal of claim 10, wherein when the uplink signal is transmitted by using the uplink carrier based on the E-UTRA operating operation band 21, the predetermined MSD value is 23.45 dB.

17. The wireless terminal of claim 10, wherein when the uplink signal is transmitted by using the uplink carrier based on the E-UTRA operating band 28, the predetermined MSD value is 3.12 dB.

18. The wireless terminal of claim 10, wherein when the uplink signal is transmitted by using the uplink carrier based on the E-UTRA operating band 41, the predetermined MSD value is 30.35 dB.

* * * * *